US010930069B1

(12) United States Patent
Jackson et al.

(10) Patent No.: US 10,930,069 B1
(45) Date of Patent: Feb. 23, 2021

(54) 3D SCANNING AND MODELING SYSTEM

(71) Applicant: Amazon Technologies, Inc., Seattle, WA (US)

(72) Inventors: Brian P. Jackson, Seattle, WA (US); Thomas Lund Dideriksen, Seattle, WA (US); Eric P. Bennett, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/272,566

(22) Filed: Feb. 11, 2019

(51) Int. Cl.
*G06T 17/20* (2006.01)
*G06T 7/60* (2017.01)
*G06T 7/521* (2017.01)

(52) U.S. Cl.
CPC .............. *G06T 17/20* (2013.01); *G06T 7/521* (2017.01); *G06T 7/60* (2013.01); *G06T 2207/10028* (2013.01)

(58) Field of Classification Search
None
See application file for complete search history.

(56) References Cited

U.S. PATENT DOCUMENTS

2015/0328004 A1* 11/2015 Mafhouz ................ A61F 2/28
700/98
2017/0161948 A1* 6/2017 Hua ..................... G06T 17/205

* cited by examiner

*Primary Examiner* — Said Broome
(74) *Attorney, Agent, or Firm* — Knobbe, Martens, Olson & Bear, LLP

(57) ABSTRACT

Systems and methods are described for generating models of three-dimensional objects using an identified template from a library of reference objects. An object may be scanned using a 3D scanner or other computing device, which may generate scan data including a "point cloud" of geometric points corresponding to the surface of the object. The point cloud or other scan data may be used to identify a reference object that corresponds to the scanned object, and a normalized point cloud may be obtained for the reference object. The normalized point cloud may then be deformed to more accurately fit the shape of the scanned object, and a 3D model may be generated based on the deformed point cloud. Multiple templates may be used to generate a normalized point cloud for an object that partially corresponds to more than one reference object, and images, meshes, wireframes, or other representations may be generated.

15 Claims, 5 Drawing Sheets

*IMAGE*

*POINT CLOUD*

*WIREFRAME MESH*

*REFERENCE MODEL*

IMAGE
210

POINT CLOUD
220

WIREFRAME MESH
230

REFERENCE MODEL
240

3D SCANNING AND MODELING SYSTEM

BACKGROUND

Generally described, computing devices may be utilized to scan three-dimensional ("3D") objects and create models of these objects. Computing devices may be equipped with cameras, rangefinders, light projectors, or other sensors that collect information about the shape of an object, and the collected information may then be used to create a mathematical model. The collected information may include, for example, photographic images, distances between a sensor and points on the surface of the object, and other information that may be used to reconstruct the physical object as a three-dimensional model.

Computer-generated models of objects may thus capture topological properties of the object, such as seams, edges, faces, curves, and the like. For example, the computing device may capture a "point cloud" of geometric points corresponding to the surface of an object, and may represent topological features of the object as vertices or polygons by connecting various points in the point cloud. These representations may be used to create a mesh or a wireframe that represents the object and approximates its topological features.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
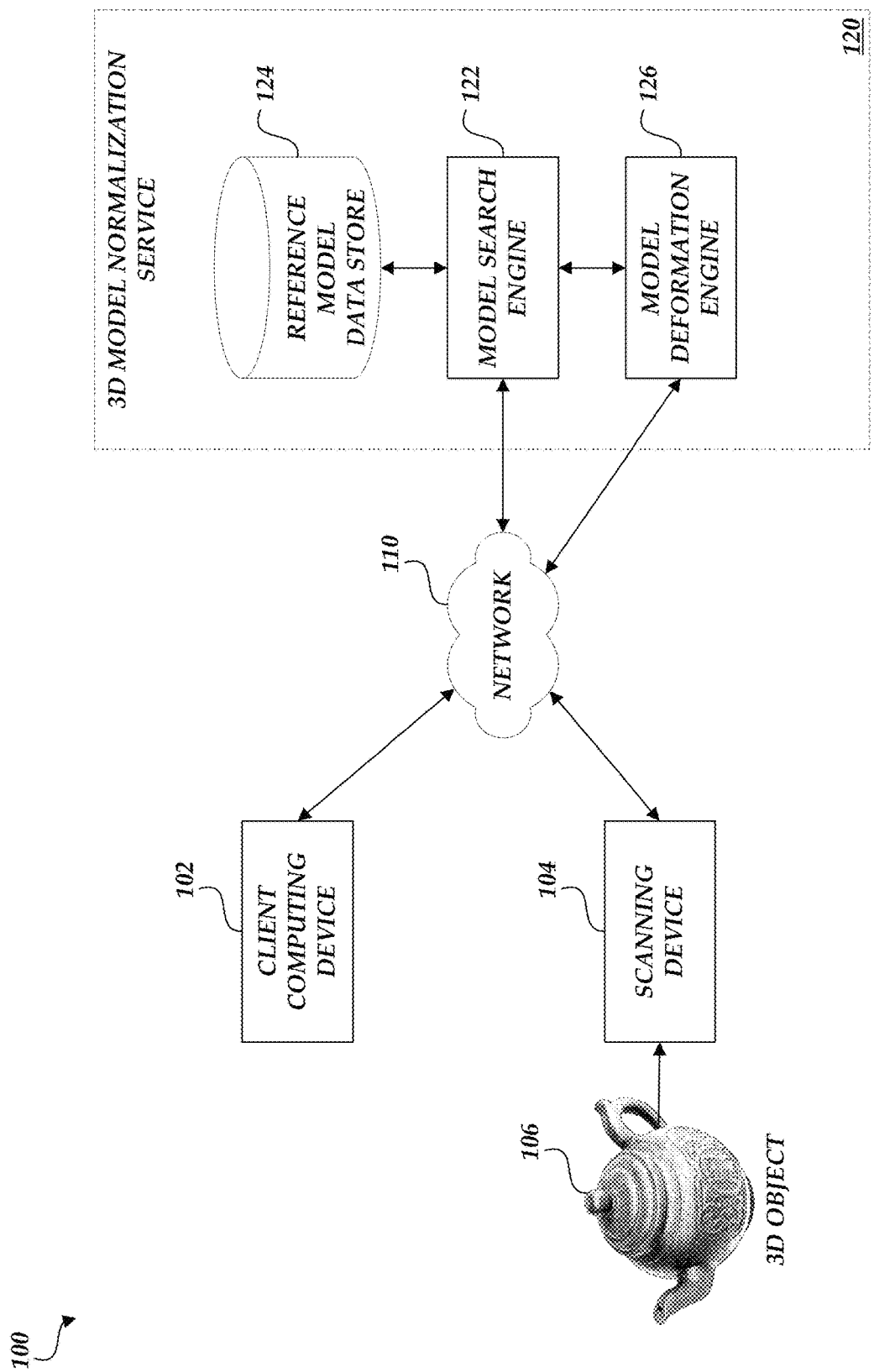
FIG. 1 is a functional block diagram depicting an example network environment for implementing a 3D model normalization service in accordance with aspects of the present disclosure.

Generally described, aspects of the present disclosure relate to 3D scanning and modeling. More specifically, aspects of the present disclosure are directed to systems, methods, and computer-readable media related to a 3D model normalization service. As described herein, a 3D model normalization service may combine sensor data from a scanner or other device with reference data regarding the topological properties of "known" objects to may produce models that are more accurate and easier to manipulate as compared to models that are generated from the raw output of a scan.

Illustratively, a computing device may be used to collect information regarding a three-dimensional object. The collected information may include, for example, distance estimates obtained by projecting a structured light pattern (e.g., a grid of horizontal or vertical lines) onto the object and capturing the resulting distortions of the pattern. This information may be processed to generate a point cloud, which may identify thousands or millions of points in three-dimensional space that are estimated to correspond to the surface of the object. In some embodiments, a mesh or a wireframe of the object may be derived from the point cloud, or a point cloud may be derived from a previously obtained mesh or wireframe. In other embodiments, the collected information may include other geometric data that define points in multi-dimensional space, such as voxel data, pixel data, polygon mesh data, etc. The collected information may further include images of the object, mass or volume information, color, texture, or other information that may be used to construct a model of the object.

The information that a computing device can collect regarding an object is necessarily limited by factors such as the resolution of scanning devices, the properties of the object, and the conditions under which a scan is performed. For example, an object such as a cup or plate may have surfaces that are flat or uniformly curved, but inaccuracies in the scanning device may cause those surfaces to be represented in a polygon mesh as a collection of irregular polygons that are almost flat or almost uniformly curved. Similarly, the points that are captured in a point cloud may not consistently land on an edge of the object, and thus a model based on the point cloud may represent a linear edge as a zig-zagging line that approximates the edge. A model based on the raw data collected by a scanning device may thus be difficult to use, since the irregularities introduced by the scanning process may complicate editing or may reduce the accuracy of the model.

In some aspects, the information collected regarding an object may be incomplete. For example, a scanning device may capture limited information or no information regarding the bottom surface of an object, the "back" of an object (e.g., surfaces facing away from the scanning device), surfaces at a right or oblique angle to the scanning device, surfaces that are blocked from view by another part of the object, or other surfaces that are not fully exposed to the scanning device or its sensors. As a further example, all or part of the object may be reflective or transparent, or may have a color, texture, or pattern that affects the scanning device's ability to detect a structured light pattern. As a still further example, projecting a structured light pattern may create shadows or otherwise obscure parts of the object. The collected information for all or part of the object may thus be incomplete or of relatively low quality, which may limit the usefulness of the resulting 3D scan.

To address the aforementioned issues, a 3D model normalization service may be used. The 3D model normalization service may compensate for irregularities that are introduced in the scanning process by comparing the collected scanning data to a collection of normalized reference models, identifying a model that can be used as a template for the scanned object, and deforming the template as needed to correspond to the scanned object. For example, a scanning device may scan an object, such as a coffee mug, and produce a point cloud. The point cloud may follow the general contours of the exterior surface of the coffee mug, but the captured points may be irregularly spaced, and may not fully or accurately capture certain properties of the mug, such as a consistent curvature of a surface or a consistent angle between surfaces. The scanning device may similarly produce a wireframe or mesh of the mug, but the lines of the wireframe or the polygons of the mesh may similarly be irregular relative to the underlying mug. The scanning device may further capture additional scan data regarding the object, such as images, textures, volumes, masses, or other information.

The 3D model normalization service may obtain the scanned point cloud, wireframe or mesh, and other scan data, and may use this data to identify a reference model for the object being scanned, or in some embodiments a reference model for the type or category of object being scanned. For example, the service may identify a "coffee mug" template based on an image of the scanned object. The "coffee mug" template may include a reference model of a generic coffee mug, which may be a real or virtual object. The generic coffee mug, for example, may be a handle attached to the side of a right circular hollow cylinder that is closed at the bottom. The reference model may include a normalized point cloud, which may include points that are consistently spaced about the features of the object and that accurately reflect the topological features of the object. For example, the normalized point cloud for a generic coffee mug may include points on the exterior of the body of the mug that are a consistent radius from a vertical axis, aligned vertically and horizontally, and a consistent distance from each other.

In some embodiments, the reference model may include a normalized wireframe, which may include lines or curves that are consistently mapped to the topology of the object. In other embodiments the reference model may include a normalized mesh, which may include polygons that have a consistent relationship to the curvature and edges of the object. The reference model may further include information regarding relationships between points in the point could, which may be used to facilitate tessellating the object (e.g., generating polygons to cover the surface of the object) or otherwise generating a mesh or wireframe. For example, the reference model may indicate that certain points or lines represent an edge of the object, a flat or curved surface, a rectangular surface (e.g., one that would be suitable for rendering with rectangular polygons), or have other relationships.

The 3D model normalization service may further determine one or more deformations to apply to the identified reference model in order to make that model a better fit for the scanned object. For example, the handle of the scanned coffee mug may be a different shape than the one in the reference model, or may attach to the mug at different points. As a further example, the walls of the scanned coffee mug may be thicker or thinner than the template, or their shape may vary from the reference model (e.g., the diameter of the mug may taper, bulge, or otherwise differ from an idealized cylinder, or the mug may not be cylindrical). The 3D model normalization service may thus identify deformations such as "inflating" or "deflating" the model (e.g., by expanding or contracting distances between points in the point cloud), stretching or distorting the shape of the model, or otherwise modifying the normalized point cloud to make it conform more closely to the shape of the scanned object. In some embodiments, conformity may be measured as a difference between the volume of space that the deformed point cloud encloses and the volume of space that the scanned point cloud encloses. Additionally, in some embodiments, the service may rotate or otherwise align the normalized point cloud to position it relative to the scanned point cloud before applying deformations.

In some embodiments, the template for an object or category of objects may be divided into parts or components. For example, the "coffee mug" template may be divided into a body component and a handle component, and each of these components may be deformed independently. The template may further include guidelines or criteria for deforming the individual components. For example, the handle component may specify that coffee mug handles vary in size and shape, attach to the body of the coffee mug at the high end of the handle and optionally at the low end of the handle, and so forth. In further embodiments, the components may be implemented as separate templates. The 3D model normalization service may thus "mix and match" templates for the individual components. For example, the service may have a "cylindrical coffee mug body" template and an "octagonal coffee mug body" template, and may select one of these templates to combine with a "large handle" template in order to create and deform a normalized point cloud for the scanned object. As a further example, the service may have a "generic furniture leg" component, which may be applied to various items of furniture including tables, chairs, barstools, and so forth. Additionally, in some embodiments, the service may iteratively select and deform various models to determine a "best fit" for all or part of a scanned object.

The 3D model normalization service may, in some embodiments, generate metadata regarding the template or templates used, the deformations performed, the quality of the resulting match (for all or part of the scanned object), and other information that may be provided or included with the resulting 3D model. The metadata may indicate, for example, that the service identified the scanned object as belonging to a particular type or category of objects, and then identify the template(s) from that category that were used and the deformations that were performed. In some embodiments, the 3D model normalization service may determine a computing device to receive the output 3D model based on criteria such as the template that was used to create the model, the category of the template, the quality of the result, or other criteria. In yet other embodiments, the service may send its output to a user or a service for manual correction if the assessed quality of the match is below an acceptable threshold.

It will be understood that the 3D model normalization service described herein addresses a technical problem that specifically arises in the realm of computer networks, and in particular addresses a problem that arises in the realm of modeling physical objects. It will further be understood that the technical problem described herein is not analogous to any pre-Internet practice, and that the 3D model normalization service improves the performance of a computing device at the task of generating accurate and readily manipulated 3D models.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments. Furthermore, embodiments of the present disclosure may include several novel features, no single one of which is solely responsible for its desirable attributes or which is essential to practicing the embodiments herein described.

FIG. 1 is a functional block diagram depicting an example network environment 100 for implementing a 3D model normalization service in accordance with aspects of the present disclosure. It will be understood that the network environment 100 may include more (or fewer) elements than those shown in FIG. 1. It is not necessary, however, that all of these elements be shown in order to provide an enabling disclosure.

In the illustrated embodiment, the network environment 100 includes a client computing device 102, a scanning device 104, and a 3D model normalization service 120, all of which communicate with each other via a network 110. The network 110 may illustratively be any wired or wireless network, or combination thereof. In addition, the network 110 may include, but is not limited to, a cellular telecommunications network, Wi-Fi® network, cable network, satellite network, mesh network, personal area network, local area network (LAN), wide area network (WAN), public or private intranet, the Internet, or other public or private communications network or networks, or any combination thereof. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or some other type of wireless network. The network 110 may use protocols and components for communicating via the Internet or any of the other aforementioned types of networks. In some embodiments, the network 110 may be omitted, and one or more of the client computing device 102, scanning device 104, or 3D model normalization service 120 may communicate directly with each other.

The client computing device 102 may illustratively be any computing device that implements aspects of the present disclosure, such as transmitting requests to the scanning device 104 to scan an object 106, or transmitting requests to the 3D model normalization service 120 to generate a normalized 3D model. Examples of client computing devices 102 include, but are not limited to, devices such as desktop computers, server computers, laptop computers, tablets, personal digital assistants (PDAs), mobile phones, electronic book readers, other wireless handheld devices, set-top or other television boxes, media players, video game platforms, kiosks, glasses or other wearable devices, or any other device with a hardware processor.

The scanning device 104 may similarly be any computing device that implements aspects of the present disclosure, such as scanning an object 106 and producing scan data as described herein. Examples of scanning devices 104 include, for example, handheld 3D scanning devices, desktop 3D scanning devices, sonar devices, mobile computing devices, cameras, rangefinders, or combinations thereof. In some embodiments, the client computing device 102 and the scanning device 104 may be the same device. In the illustrated embodiment, the network environment 100 may include an object 106, which may be scanned by the scanning device 104 to obtain scan data as described herein.

The 3D model normalization service 120 is described in more detail with reference to FIG. 5 below. In the illustrated embodiment, the 3D model normalization service 120 includes a reference model data store 124, a model search engine 122, and a model deformation engine 126. The data store 124 may illustratively be any non-transitory computer-readable media including but not limited to hard drives, solid state devices, flash memories, EEPROMs, or other storage media accessible to or by a device such as an access device, server, or other computing device. In various embodiments, the data store 124 may be implemented as a database, a database server, a component of another server or service (e.g., the model search engine 122), or may be implemented as multiple data stores. A data store may also or alternatively be distributed or partitioned across multiple local and/or remote storage devices as is known in the art without departing from the scope of the present disclosure. In further embodiments, as described above, the data store 124 may include or be embodied in a data storage web service. The model search engine 122 and the model deformation engine 126 may be implemented, in various embodiments, as hardware or software components of a physical or virtual computing device, as components of multiple computing devices, or combinations thereof.

It will be understood that many of the components described in FIG. 1 are optional, and that embodiments of the present disclosure may combine or reorganize the components. For example, in some embodiments, the scanning device 104 may be omitted or may be a component of the client computing device 102. Furthermore, the components need not be distinct or discrete. For example, the client computing device 102 and the 3D model normalization service 120 may be represented in a single physical device, or, alternately, may be split into multiple physical devices.

Figure 2:
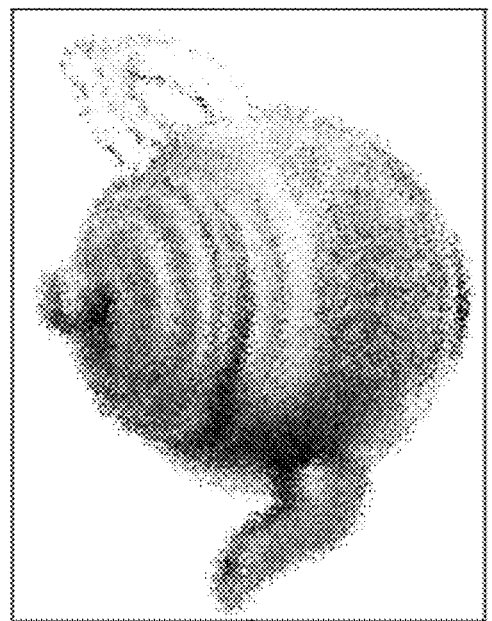
FIG. 2 is a pictorial diagram depicting examples of scan data that may be obtained and compared to a reference model in accordance with aspects of the present disclosure.
Figure 2:
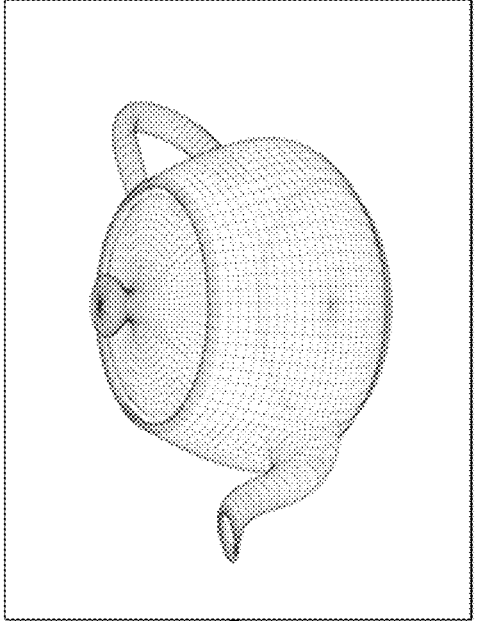
Figure 2:
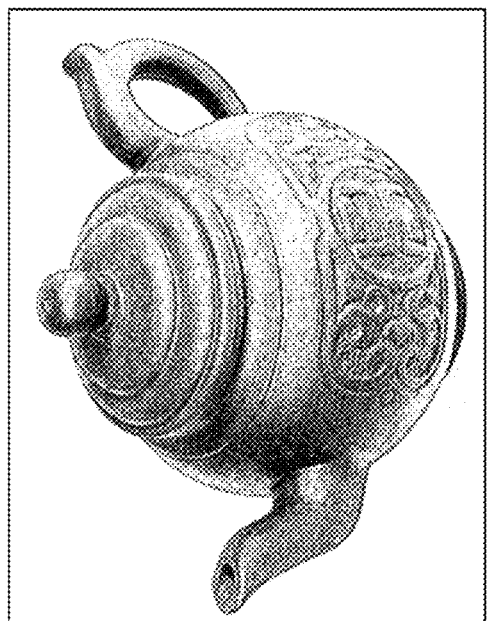
Figure 2:
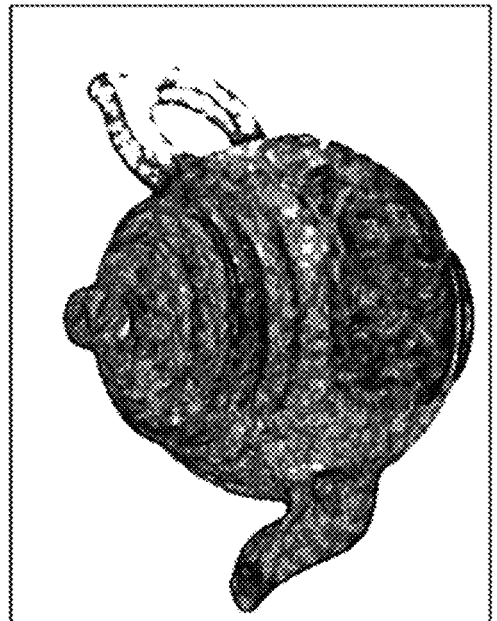

FIG. 2 is a pictorial diagram depicting illustrative examples of various types of scan data and reference data that may be obtained by a 3D model normalization service 120 and utilized to generate a normalized 3D model. Scan data may be obtained, for example, from a scanning device, such as the scanning device 104 depicted in FIG. 1. In some embodiments, scan data may be obtained from a client computing device (e.g., the client computing device 102), and the 3D model normalization service 120 may not interact directly with a scanning device. Reference data may illustratively be obtained from a data store, such as the reference model data store 124 of FIG. 1.

Scan data may include one or more images 210 of an object 106. In various embodiments, images 210 may be captured by one or more cameras or other sensors that are associated with the scanning device 104, the client computing device 102, or another device. An image 210 may, in some embodiments, contain information regarding the size of the object 106. For example, the image 210 may depict the object 106 against a background that contains indications of height (e.g., horizontal lines), and the height of the object 106 may thus be determined by analyzing the indications that are visible in the image 210. In other embodiments, multiple images 210 may depict the object 106 from various angles or dimensions, which may be fixed in order to provide a frame of reference. In further embodiments, some or all of the images 210 may include a light pattern or other indicator that may be processed to identify the locations of points on the surface of the object 106. In some embodiments, an image 210 may be generated by processing other scan data. For example, an image 210 may be generated by processing a point cloud 220 or wireframe mesh 230 to produce a two-dimensional image 210 of the object 106 from a particular angle.

Scan data may further include a point cloud 220. The point cloud, as described above, is a collection of geometric points in space that correspond to the surface of the object 106, which may be obtained by, e.g., using light or sound to estimate distances between points on the surface of the object 106 and a sensor. The point cloud 220 may illustratively contain thousands or millions of points, depending on factors such as the capabilities of the scanning device 104 or the complexity of the object 106. In some embodiments, the point cloud 220 may be generated by processing other scan data. For example, multiple two-dimensional images 210 may be analyzed to estimate the coordinates of points on the surface of the object 106. As a further example, a wireframe mesh 230 of the object 106 may be deconstructed to identify points that correspond to the ends of the wireframe edges.

In some embodiments, the point cloud 220 may be sparse, incomplete, or inaccurate due to limitations of the scanning process, characteristics of the object 106, or other factors. In the illustrated example, a portion of the object 106 (the handle of the teapot) did not scan well, resulting in a point cloud 220 that contains relatively few points for this portion of the object 106. Three-dimensional models of the object 106 that are generated from the point cloud 220 may therefore be less accurate when modeling this portion.

Scan data may still further include a wireframe mesh 230. In some embodiments, the wireframe mesh 230 may be generated by "connecting the dots" of the point cloud 220, using various surface construction techniques known in the art. In other embodiments, the wireframe mesh 230 may be generated by scanning the object 106. Additionally, in some embodiments, non-uniform rational basis spline ("NURBS") surfaces or other three-dimensional representations of the object 106 may be generated from or included in the scan data. Scan data may further include other information that is obtained by scanning the object 106, such as color, size, weight, texture, reflectivity, material (e.g., wood, glass, metal, etc.), or other features or characteristics of the object 106. In the illustrated embodiment, the wireframe mesh 230 is similarly incomplete with regard to a portion of the scanned object 106.

In various embodiments, a 3D model normalization service 120 may use the obtained scan data, which may be in the form of images 210, point clouds 220, or wireframe meshes 230, to identify a reference model 240 that corresponds to the object 106. The reference model 240 may include a normalized point cloud, normalized wireframe, or other normalized representation of a physical or virtual object that is at least partially similar to the object 106, and whose shape may be morphed or deformed into the shape of the object 106 to produce normalized data corresponding to the shape of the object 106. For example, in the depicted illustration, the image 210, point cloud 220, and wireframe mesh 230 have been generated by scanning a particular teapot, which has particular characteristics such as a handle, spout, lid, and an embossed design on the body of the pot. The 3D model normalization service 120 may analyze and compare these representations of the teapot to a corpus of reference models, and may identify a particular reference model 240 that corresponds to teapots generally. The reference model 240 may include a point cloud whose points are uniformly distributed relative to the geometry of the teapot shape. As further described below, the 3D model normalization service 120 may then adjust this model to conform to the shape of the scanned teapot by varying the size and position of different parts of the model. For example, the 3D model normalization service 120 may resize and reposition the handle of the reference teapot model to more closely conform to the handle of the scanned teapot, may adjust the body of the reference teapot to more closely match the curvature of the scanned teapot, and may use the reference model to "fill in the blanks" with regard to portions of the scanned teapot that did not scan completely or accurately. The 3D model normalization service 120 may thus replace an irregular or incomplete point cloud 220 with a point cloud that is easier to manipulate and whose points are better aligned to the shape of a teapot.

Figure 3:
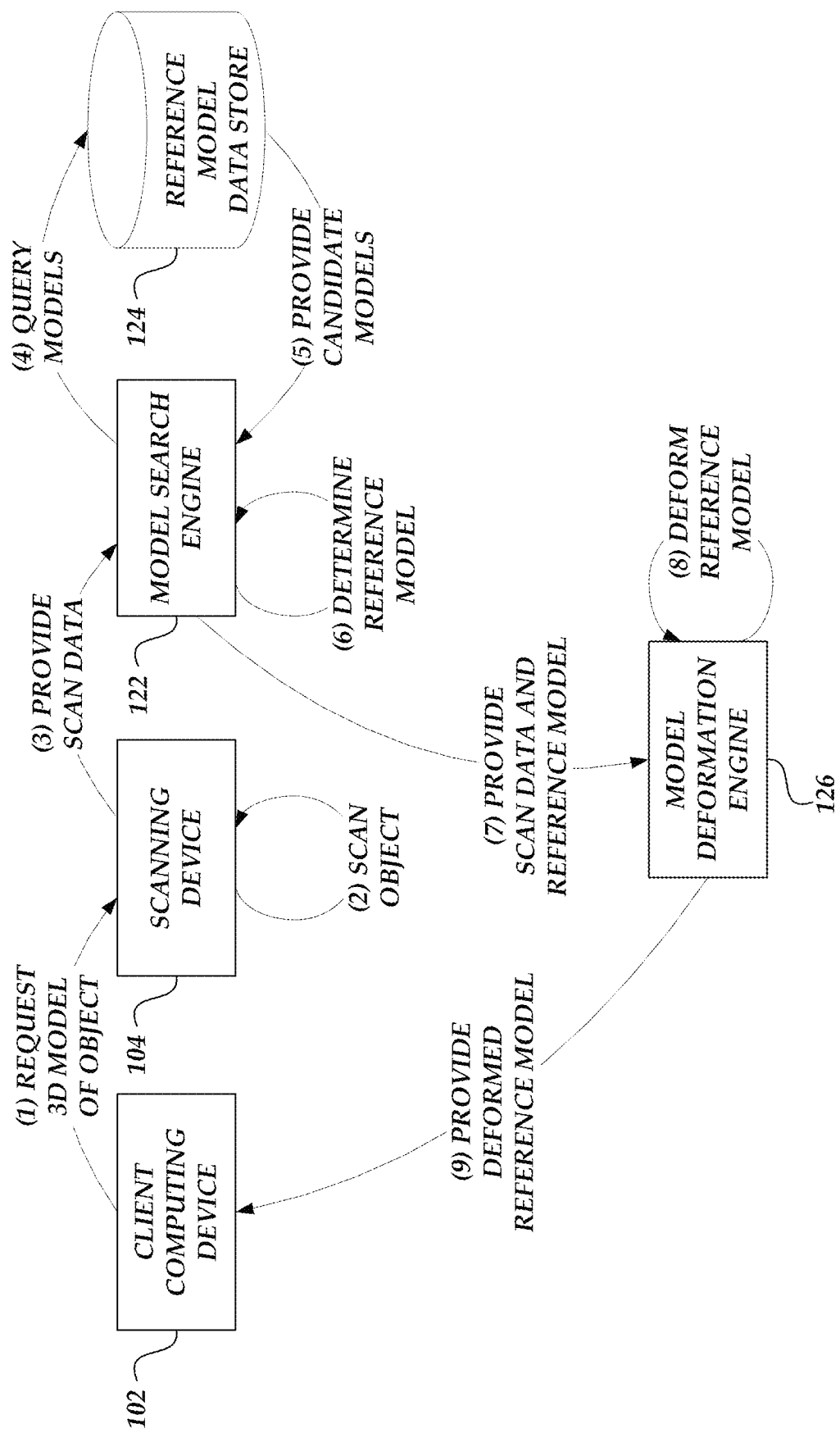
FIG. 3 is a block diagram depicting example interactions between the components of the example network environment shown in FIG. 1 for generating a normalized 3D model in accordance with aspects of the present disclosure.

FIG. 3 depicts example interactions for generating a normalized 3D model of an object in accordance with aspects of the present disclosure. At (1), the client computing device 102 may request generation of a normalized 3D model of an object, such as the object 106 depicted in FIG. 1. At (2), the scanning device 104 may scan the object to obtain scan data, and at (3) that data may be provided to the model search engine 122 of a 3D model normalization service. In some embodiments, the interaction at (2) may be carried out prior to the decision to request a normalized 3D model, and the interactions at (1) and (3) may therefore be combined to include previously obtained scan data in a direct request to a 3D model normalization service. In other embodiments, the scanning device 104 may be integrated into the 3D model normalization service (or vice versa), and thus a normalized 3D model may be provided in response to any request to generate a 3D model.

In some embodiments, the 3D model normalization service may provide a user interface, application programming interface, or other frontend that interacts with client computing devices 102 or scanning devices 104 in lieu of directly interacting with the model search engine 122.

At (4), the model search engine 122 queries a database of reference models, such as the reference model data store 124, to identify one or more models that may be usable as templates for all or part of the scanned object. In some embodiments, the model search engine 122 may determine a type or category of the scanned object based on the scan data, and may query the database for templates associated with that category. In other embodiments, the model search engine 122 may perform an image search for template images that are related to images in the scan data, or may analyze characteristics of a scanned point cloud to determine a degree of correspondence between the scanned object and various reference models. For example, the model search engine 122 may determine, based on a point cloud, mesh, or image, that the scanned object has a flat horizontal surface and four legs, and may identify reference objects having similar properties (e.g., tables, desks, etc.). In some embodiments, the model search engine 122 may determine that all or part of the scanned object does not map to any of the available templates, and may prompt a user or maintainer of the 3D model normalization service to create or designate a suitable template for the object. At (5), the reference model data store 124 may provide search results in the form of one or more candidate reference models.

At (6), the model search engine 122 may determine the "best" match or matches between the scanned object and the candidate reference models, based on analyses of the scan data and the characteristics of the reference models. In some embodiments, the reference models may identify features of the object, and may include a normalized point cloud that partially corresponds to the identified features. For example, an object may have a flat surface, curved surface, or irregular surface as part of its exterior, may have a defined edge, opening, indentation, or extrusion, or may correspond to a particular geometric shape. The reference model for the object may identify these features and include a point cloud that contains points corresponding to these features. The model search engine 122 may thus determine a match based on the reference model having features in common with the scanned object.

At (7), the model search engine 122 may provide the identified reference model(s) to the model deformation engine 126. In some embodiments, the model search engine 122 may provide information associating a reference model with a portion or portions of the object. For example, as discussed above, the model search engine 122 may identify one reference model that corresponds to the handle of a coffee mug, and another reference model that corresponds to the body of the coffee mug. The model search engine 122 may thus indicate the relationship(s) between the scanned object and the identified reference model(s). Illustratively, the model search engine 122 may identify a subset of the scanned object's point cloud, a volume of space, a geometric orientation of the reference model(s) relative to the scanned object, or otherwise identify how the reference model corresponds to the object.

At (8), the model deformation engine 126 may determine and apply one or more deformations to the reference model(s) to improve the "fit" between a reference model and the scanned object. The deformations may illustratively include inflating, deflating, stretching, contracting, rotating, bending, twisting, or otherwise changing the shape of the reference model to conform to the object. The model deformation engine 126 may apply deformations to all or part of a reference model, and may apply multiple deformations to the same model. In some embodiments, the model deformation engine 126 may determine a set of potential deformations, and apply them iteratively or in combinations to determine which deformation(s) produce the best fit for the scanned object.

At (9), the model deformation engine 126 may respond to the request at (1) by providing the deformed, normalized reference model to the client computing device 102. In various embodiments, as discussed above, the model deformation engine 126 may provide the deformed normalized reference model to the scanning device 104, a frontend associated with the 3D model normalization service, or another computing device. In some embodiments, the model deformation engine 126 may generate and provide metadata regarding the normalization of the model. Metadata may include, for example, information regarding the corpus of reference models (e.g., a version number or a timestamp at which the corpus was last updated), information regarding tolerances used to determine a "best fit," information identifying the reference models used, how and where they were applied, the type or category of reference model(s), the deformations made, and other information.

It will be understood that the interactions described with reference to FIG. 3 are provided for purposes of example, and that many other interactions and variations are within the scope of the present disclosure. For example, the model search engine 122 may present search results to the client computing device 102 via a user interface, and may prompt a user to select or confirm the templates to be used when generating the normalized 3D model. As a further example, the model deformation engine 126 may store information in the reference model data store 124 indicating how a particular model was deformed or used, such that a template that is frequently deformed in a particular way may be identified and replaced with a template that is less likely to require the deformation. FIG. 3 is thus understood to be illustrative and not limiting.

Figure 4:
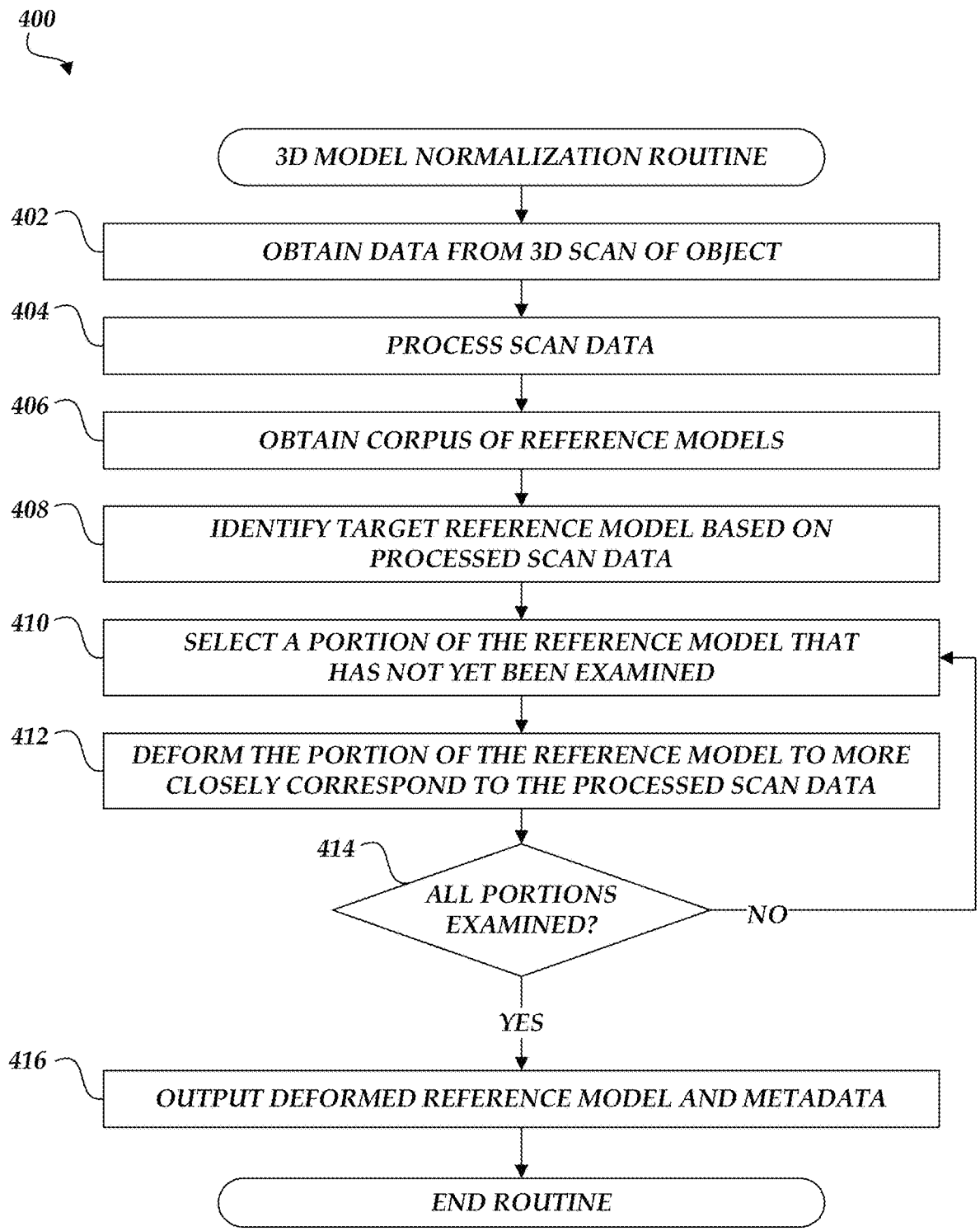
FIG. 4 is a flow diagram depicting an illustrative 3D model normalization routine that may be carried out in accordance with aspects of the present disclosure.

FIG. 4 is a flow diagram depicting an example 3D model normalization routine 400 in accordance with aspects of the present disclosure. The routine 400 may be carried out, for example, by the 3D model normalization service 120 of FIG. 1. At block 402, scan data may be obtained for a particular object. In some embodiments, scan data may be obtained from a scanning device, such as the scanning device 104 of FIG. 1. In other embodiments, scan data may be obtained from a client computing device (e.g., the client computing device 102) or another device. In some embodiments, scan data for an object may be obtained in response to a request to generate a 3D model of the object.

At block 404, in some embodiments, the scan data may be processed to generate a point cloud, image, or other data to be used when identifying a reference model. For example, a point cloud or wireframe may be processed to generate an image of the scanned object, or a wireframe or a set of images may be processed to generate a point cloud. In some embodiments, the scan data may be rotated, aligned, or otherwise modified to facilitate comparisons to reference data. For example, a point cloud may be rotated about an axis such that a flat surface of the object is parallel to a reference plane. In other embodiments, the scan data may be processed to identify particular features or parts of the object, such as flat surfaces or extrusions.

At block 406, a corpus of reference models may be obtained. Illustratively, reference models may be obtained from a data store, such as the reference model data store 124 of FIG. 1. In some embodiments, a search engine may be queried to obtain reference models having certain parameters or features, or to obtain reference models that correspond to an image or point cloud in the scan data. In other embodiments, a library of reference models may be obtained.

At block 408, one or more target reference models may be identified based on the processed scan data. As described above, all or part of the target reference models may correspond to all or part of the scan data. Target reference models may be identified by, for example, comparing an image in the scan data to a reference image, comparing a point cloud in the scan data to a reference point cloud, and so forth. In some embodiments, a target reference model may correspond to a type or category of objects, and the object that corresponds to the scan data may be identified as belonging to the type or category. In other embodiments, scan data parameters such as the object's weight, size, and the like may be considered when identifying a target reference model.

At block 410, a portion of the reference model that has not yet been examined may be selected. In some embodiments, the entire reference model may be selected. At block 412, the selected portion of the reference model may be deformed to more closely correspond to a corresponding portion of the scan data. Illustratively, the reference model may include a normalized point cloud, and the normalized point cloud may be deformed to more closely fit the shape of a point cloud in the scanned data. In some embodiments, a determination may be made as to whether a deformation is required, and the determination may be that a deformation is not necessary. For example, an "aluminum can" reference model may correspond exactly to the size and shape of a scanned aluminum can, or may correspond within a tolerance that would not be significantly improved by deforming the reference model. In such embodiments, the routine 400 may determine that a deformation is not necessary, and may therefore branch to decision block 414 without performing a deformation at block 412. As described above, deformations may include any number of transformations that change the size or shape of the reference model to more closely correspond to the scan data.

In some embodiments, a determination may be made as to whether the deformation(s) performed at block 412 were successful in making the normalized point cloud a closer fit to the scan data. For example, the routine 400 may assess whether the volume of space enclosed by the normalized point cloud is within a threshold percentage of the volume enclosed by the scan data, or may determine whether the normalized point cloud covers a threshold percentage of the same volume as the scan data. If the determination is that the deformation(s) performed at block 412 do not satisfy these criteria, then the routine 400 may replace the relevant portion of the normalized point cloud with the corresponding scan data, or in some embodiments may revert the relevant portion to an un-deformed normalized point cloud. The routine 400 may further generate metadata indicating the deformations that were attempted and the results, which may be included in the output as described below. In other embodiments, the routine 400 may identify that the scan data was incomplete (e.g., that information regarding the bottom of the object or another surface of the object is missing from the scan data), and may determine deformations for corresponding portions of the normalized point cloud by extrapolating from the available scan data (e.g., by stretching or warping that portion of the normalized point cloud to connect to surfaces of the object for which scan data is available).

At decision block 414, a determination may be made as to whether all of the portions of the reference model have been examined. If not, the routine 400 branches to block 410, and iterates through blocks 412 and 414 until all of the portions have been processed. The routine 400 then branches to block 416, where the deformed, normalized reference model and associated metadata (which may be generated while carrying out blocks 406-414) may be output. In some embodiments, all or part of blocks 408-416 of the routine 400 may be carried out iteratively, and the routine 400 may output more than one normalized 3D model for a given set of scan data. For example, the routine 400 may identify and deform multiple target reference models to determine a "best fit" model, or may iteratively perform different deformations on a particular reference model to determine an optimal set of deformations. In other embodiments, the routine 400 may determine where to deliver its output based on criteria such as the type or category of the identified reference model(s), the quality of the fit, or other criteria.

It will be understood that the 3D model normalization routine 400 depicted in FIG. 4 is provided for purposes of example, and that many variations on the routine 400 are within the scope of the present disclosure. For example, blocks 406 and 408 may be combined, and the routine 400 may identify a target reference model by querying a database rather than obtaining a corpus of reference models and evaluating them. As a further example, the routine 400 may iterate through a number of deformations at block 412, and may determine, for each deformation, whether it improved or degraded the correspondence between the target reference model and the scan data. The routine 400 may further iterate through a number of variations on a particular deformation, or various combinations of deformations, to arrive at a deformed, normalized 3D model that closely corresponds to the scan data.

Figure 5:
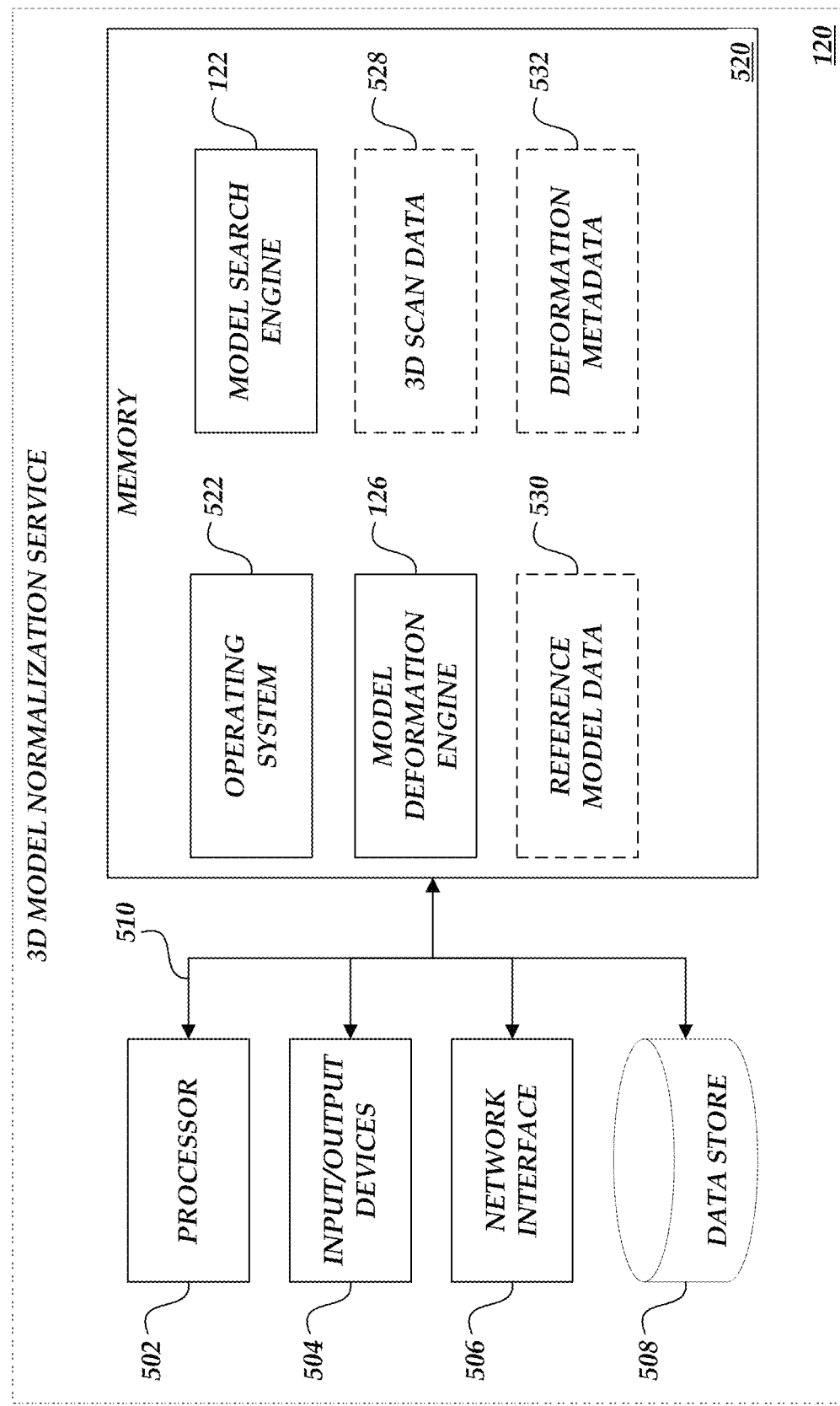
FIG. 5 is a general architecture of an example computing device that is configured to implement aspects of the present disclosure.

FIG. 5 depicts a general architecture of the 3D model normalization service 120, which includes an arrangement of computer hardware and software components that may be used to implement aspects of the present disclosure. The 3D model normalization service 120 may include many more (or fewer) elements than those shown in FIG. 5. It is not necessary, however, that all of these elements be shown in order to provide an enabling disclosure.

As illustrated, the 3D model normalization service 120 includes a processor 502, input/output devices 504, a network interface 506, and a data store 508, all of which may communicate with one another by way of a communication bus 510. The network interface 506 may provide connectivity to one or more networks (such as the network 110 depicted in FIG. 1) or computing systems and, as a result, may enable the 3D model normalization service 120 to receive and send information and instructions from and to other computing systems or services, such as the client computing device 102 or the scanning device 104 depicted in FIG. 1. In some embodiments, the 3D model normalization service 120 may be configured to process requests from the client computing device 102, such as requests to provide normalized 3D models of scanned objects.

The processor 502 may also communicate to and from a memory 520. The memory 520 may contain computer program instructions (grouped as modules or components in some embodiments) that the processor 502 may execute in order to implement one or more embodiments. The memory 520 generally includes RAM, ROM, and/or other persistent, auxiliary, or non-transitory computer-readable media. The memory 520 may store an operating system 522 that provides computer program instructions for use by the processor 502 in the general administration and operation of the 3D model normalization service 120. The memory 520 may further store specific computer-executable instructions and other information (which may be referred to herein as "modules" or "engines") for implementing aspects of the present disclosure. For example, the memory 520 may include a model search engine 122 and a model deformation engine 126, which may implement aspects of the present disclosure such as carrying out the 3D model normalization routine depicted in FIG. 4.

The memory 520 may further include scan data 528, reference model data 530, and deformation metadata 532, which may be loaded into the memory 520 as various operations are performed or may be generated by the performance of these operations. In some embodiments, the scan data 528 and the reference model data 530 may be obtained from internal or external data stores (such as the reference model data store 124 of FIG. 1), either directly or via the network 110. In other embodiments, the scan data 528 and the reference model data 530 may be obtained from the data store 608.

While the operating system 522, model search engine 122, and model deformation engine 126 are illustrated as distinct modules in the memory 520, in some embodiments, one or more of the model search engine 122 and the model deformation engine 126 may be incorporated as a module in the operating system 522 or another application or module, and as such, separate modules may not be required to implement some embodiments.

It will be recognized that many of the components described in FIG. 5 are optional and that embodiments of the 3D model normalization service 120 may or may not combine components. Furthermore, components need not be distinct or discrete. Components may also be reorganized. For example, the 3D model normalization service 120 may be represented in a single physical device or, alternatively, may be split into multiple physical devices. In some embodiments, components illustrated as part of the 3D model normalization service 120 may additionally or alternatively be included in other computing devices (such as the client computing device 102 or the scanning device 104 of FIG. 1), such that some aspects of the present disclosure may be performed by the 3D model normalization service 120 other aspects are performed by another computing device.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
   a data store configured to store a plurality of three-dimensional ("3D") model templates; and
   a processor in communication with the data store, wherein the processor is configured to execute computer-executable instructions to at least:
   receive, from a computing device, a request to generate a 3D model of a physical object;
   obtain, from a scanning device, scan data corresponding to the physical object, the scan data including a scanned point cloud and an image of the physical object;
   identify, based at least in part on the scan data, a first template from the plurality of 3D model templates, wherein the first template corresponds to at least a first portion of the physical object, and wherein the first template includes a normalized point cloud;
   determine, based at least in part on the scan data and the first template, a deformation of the normalized point cloud, wherein the deformation reduces a difference between at least a portion of the normalized point cloud and a corresponding at least a portion of the scanned point cloud;
   apply the deformation to the normalized point cloud to produce at least a modified point cloud and a first set of metadata, the first set of metadata including information regarding the deformation;
   generate the 3D model of the physical object based at least in part on the scanned point cloud and the modified point cloud; and
   transmit the 3D model to the computing device.

2. The system of claim 1, wherein the scanned point cloud comprises a plurality of geometric points corresponding to the surface of the physical object.

3. The system of claim 1, wherein the normalized point cloud comprises a plurality of geometric points corresponding to the surface of a reference object.

4. The system of claim 1, wherein the first template is identified based at least in part on the image of the physical object.

5. The system of claim 1, wherein the first template identifies a feature of the physical object, and wherein the at least a portion of the normalized point cloud corresponds to the feature.

6. The system of claim 5, wherein the feature of the physical object comprises at least one of a flat surface, curved surface, irregular surface, edge, opening, indentation, extrusion, or geometric shape.

7. A computer-implemented method comprising:
under control of a computing device configured with specific computer-executable instructions,
obtaining scan data corresponding to a physical object, the scan data including a scanned point cloud;
identifying, based at least in part on the scan data, a first template from a plurality of 3D model templates, wherein the first template corresponds to at least a first portion of the physical object, and wherein the first template includes a normalized point cloud;
determining, based at least in part on the scan data and the first template, a first deformation of the normalized point cloud, the first deformation reducing a difference between at least a portion of the normalized point cloud and a corresponding at least a portion of the scanned point cloud;
applying the first deformation to the normalized point cloud to produce a modified point cloud;
generating a 3D model of the physical object based at least in part on the modified point cloud; and
transmitting the 3D model of the physical object to a computing device.

8. The computer-implemented method of claim 7 further comprising identifying, based at least in part on the scan data, a second template from the plurality of 3D model templates, wherein the second template corresponds to at least a second portion of the physical object.

9. The computer-implemented method of claim 8 further comprising determining a second deformation based at least in part on the second template.

10. The computer-implemented method of claim 7 further comprising:
generating metadata that indicates a degree of similarity between the scanned point cloud and the modified point cloud; and
transmitting the metadata to the computing device.

11. The computer-implemented method of claim 7 further comprising aligning the at least a portion of the normalized point cloud to more closely correspond to the at least a portion of the scanned point cloud.

12. The computer-implemented method of claim 11, wherein aligning the at least a portion of the normalized point cloud comprises rotating the at least a portion of the normalized point cloud about one or more axes.

13. The computer-implemented method of claim 7, wherein the first deformation comprises inflating or deflating the at least a portion of the normalized point cloud.

14. The computer-implemented method of claim 13, wherein the first template identifies individual portions of the normalized point cloud as being inflatable or deflatable.

15. The computer-implemented method of claim 7 further comprising generating an image of the physical object based at least in part on the scanned point cloud.

* * * * *